No. 11,842. Reissued July 17, 1900.
J. F. OHMER & H. TYLER.
FARE REGISTER.
(Application filed Aug. 12, 1899.)
2 Sheets—Sheet 1.
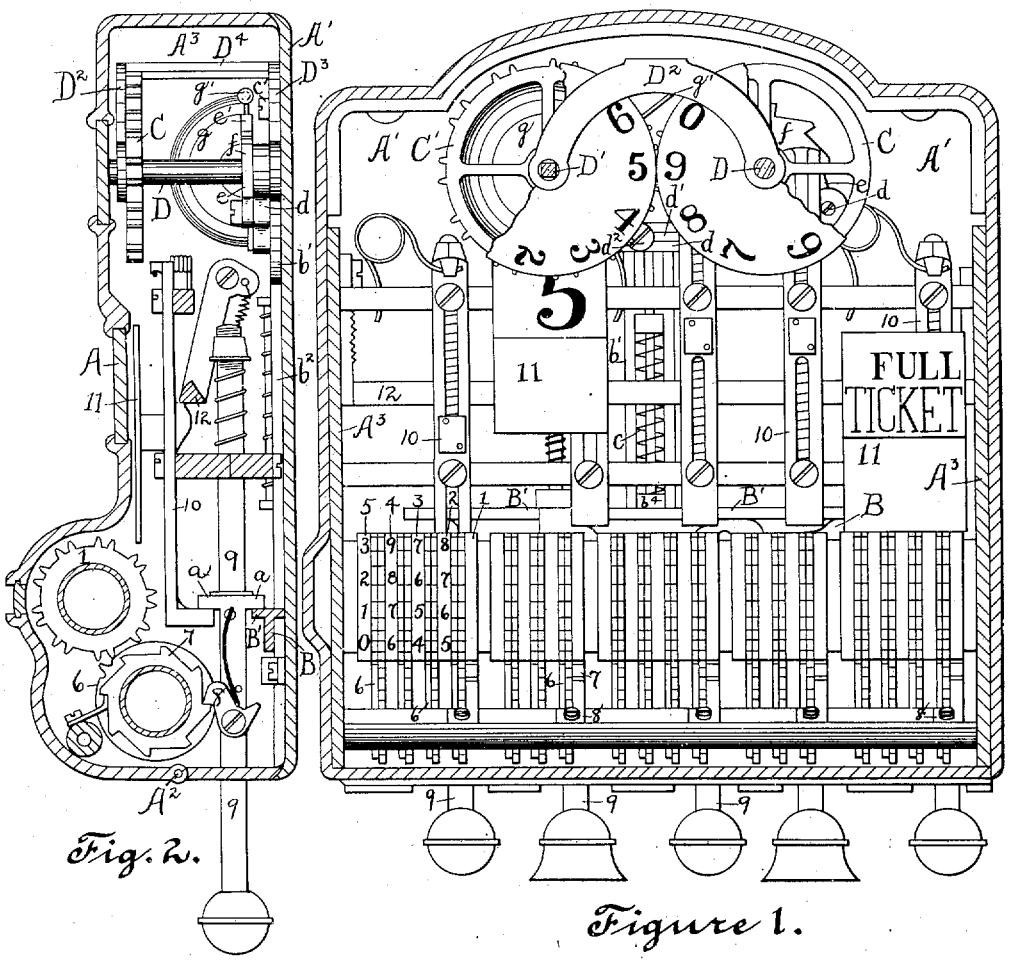
Fig. 2.
Figure 1.
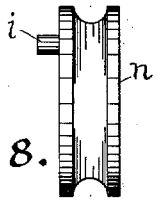
Fig. 8.
Witnesses:
Albert C. Bell.
Etha M. Smith.
Inventors
J. F. Ohmer &
H. Tyler.
By their Atty. Wm. K. Cooley.

No. 11,842. Reissued July 17, 1900.

J. F. OHMER & H. TYLER.

FARE REGISTER.

(Application filed Aug. 12, 1899.)

2 Sheets—Sheet 2.

Witnesses:

Albert C. Bell.

Etha M. Smith.

Inventors

J. F. Ohmer &

H. Tyler.

By their Atty. Wm. H. Cooley.

UNITED STATES PATENT OFFICE.

JOHN F. OHMER AND HIRAM TYLER, OF DAYTON, OHIO; SAID TYLER ASSIGNOR TO SAID OHMER.

FARE-REGISTER.

SPECIFICATION forming part of Reissued Letters Patent No. 11,842, dated July 17, 1900.

Original No. 582,366, dated May 11, 1897. Application for reissue filed August 12, 1899. Serial No. 726,996.

*To all whom it may concern:*

Be it known that we, JOHN F. OHMER and HIRAM TYLER, citizens of the United States, residing at Dayton, in the county of Montgomery and State of Ohio, have invented certain new and useful Improvements in Fare-Registers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in fare-registers for street-cars.

The object of the invention is to provide a fare-register that may be carried on the person of a conductor or that may be placed in a stationary position in a car and used as a fare and trip register combined.

To some extent the invention is an improvement on the fare-register shown and described in United States Patent No. 560,529, granted to John F. Ohmer May 19, 1896. The invention covered by said patent relates solely to a portable register, or one designed to be carried by the conductor, having a capacity for indicating the various kinds of fares and for keeping a total record of the number of each kind of fares indicated.

The present invention supplements the above by introducing certain mechanism through the agency of which the total fares or tickets taken up on each trip or any number of trips combined are indicated.

An important feature of the present invention consists in actuating such total or trip registering device by means of a mechanism arranged to be engaged or operated in common by each one of the individual fare-indicator and register-operating devices.

Figure 3:
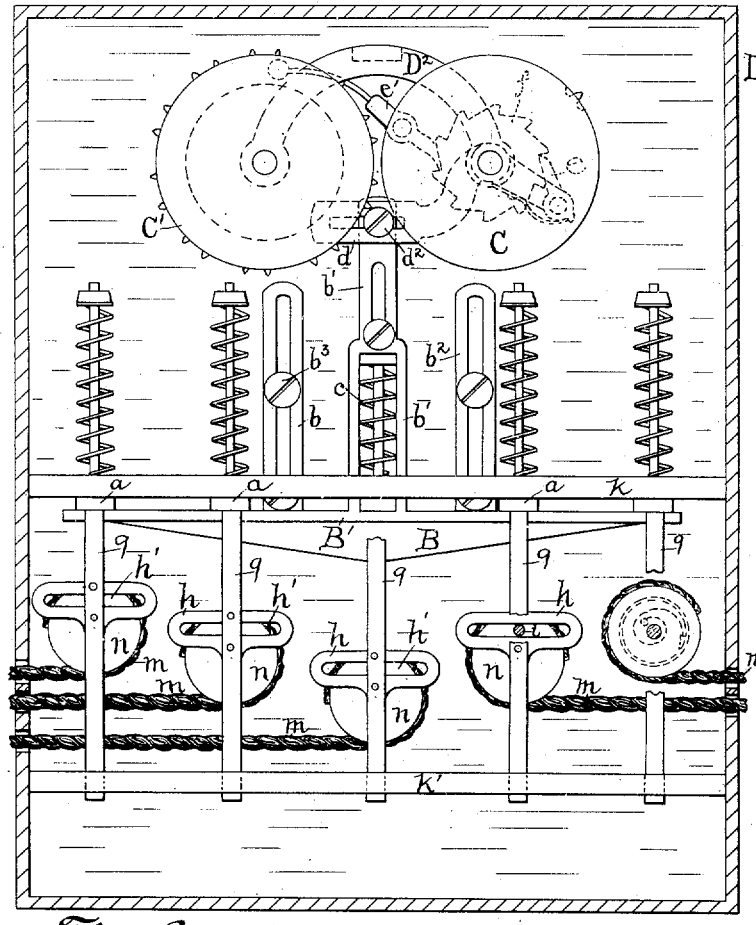
Figure 4:
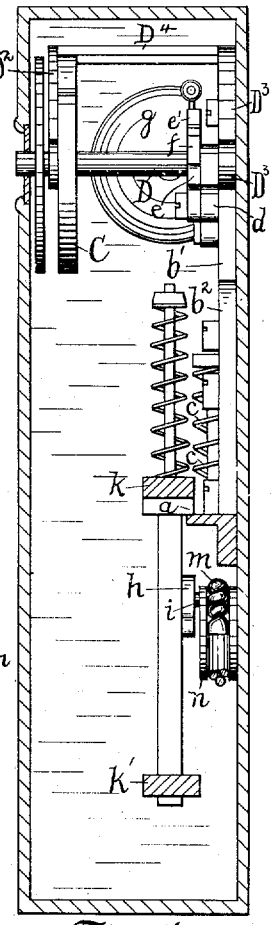
Figure 5:
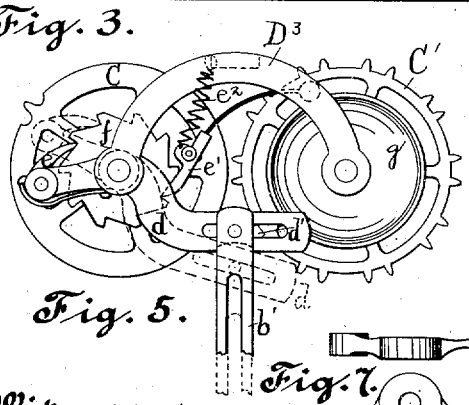
Figure 6:
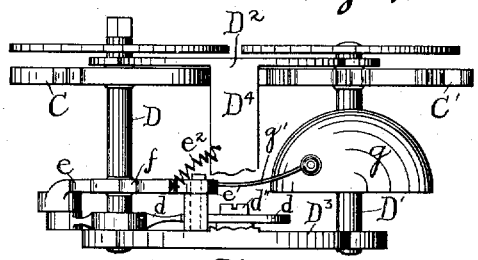
Figure 7:
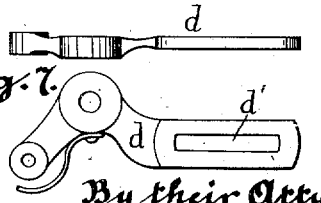

Referring to the accompanying drawings, Figure 1 is a front sectional elevation showing the interior mechanism for keeping a total record of the fares of an entire day, for indicating the different kinds of fares, and for indicating the total fares of each trip. Fig. 2 is a vertical section of the same. Fig. 3 is a front sectional elevation showing the interior mechanism adapted to be used solely as a stationary register. Fig. 4 is a vertical section of the same. Fig. 5 is an elevation of the rear side of the trip-register and indicator-wheels and adjunctive devices. Fig. 6 is a top view of the indicator-wheels as shown in Fig. 5. Fig. 7 shows top and side views of the slotted lever through which the primary trip-wheel is moved. Fig. 8 is an edge view of one of the sheaves through which the vertical sliding rods are actuated.

In a detailed description of the invention the same reference characters will be found to indicate corresponding parts throughout the several views.

Referring to Figs. 1 and 2, the inclosing case consists of front and rear portions A and A′, which have a hinged connection $A^2$ at the bottom. The back A′ has side portions $A^3$, which when the case is closed are concealed, as shown in Fig. 2. The mechanism is all supported on the rear and side portions A′ and $A^3$. Therefore the case may be opened to inspect said mechanism without detaching any of the parts by simply swinging the back A′ outward. Several parts of the interior mechanism shown in Figs. 1 and 2 will be found illustrated and described in the patent hereinbefore referred to. Therefore only a brief mention of them will be made herein, as follows:

1, 2, 3, 4, and 5 designate, respectively, several wheels of different series of total-adding register-wheels which bear specific values upon their peripheries. These wheels keep a total record of the fares for each day and are moved by a corresponding series of primary actuating-wheels 6, that are mounted in the rear thereof and moved by a ratchet-wheel 7. There is one ratchet-wheel for each series of wheels 6. The ratchet-wheels are each moved by a pawl 8, carried on a sliding rod 9. These rods likewise operate indicator-slides 10, that carry tablets 11.

12 is a transverse oscillating bar that controls the position of the slides 10, all substantially as shown and described in said patent.

Referring now to the mechanism embodied in the present invention, each sliding rod 9 is provided with a shoulder *a* in addition to the shoulder *a′*, that operates the indicator-slides.

B designates a transverse slide having a longitudinal ledge B′ and provided with slotted extensions $b$ $b'$ $b^2$, through which broad-headed screws $b^3$ project and enter the rear of the casing. These screws guide the movement of the slide B when the latter is moved downwardly by any one of the shoulders $a$ on the rods 9 or when moved upward by the expansion of a spring $c$, which is confined between the upper end of the slot in extension $b'$ and a projection $b^4$ on the inner rear side of the case.

C and C′ designate trip-indicator wheels of units and tens series, or the number of said wheels may be multiplied, if desired. The numerals on said wheels are exposed through a sight-opening in the case in the usual way. In order to have their arbors D and D′ free from any connection with the front of the case, the said arbors are journaled in the hangers $D^2$ and $D^3$, that are connected by a transverse bar $D^4$. The hanger $D^2$ is secured to the case by a suitable number of screws $c'$. The primary or units wheel C is rotated to indicate the number of passengers received to the extent of one revolution, after which the numbers are transferred to wheel C′. The following mechanism operates the units-wheel: $d$ designates an angular lever having a slot $d'$. This lever is loosely connected to the upper end of the central extension $b'$ by means of a screw $d''$, that penetrates said slot and enters the part $b'$. This lever $d$ has its fulcrum on the arbor D and is constructed with a curvature substantially as shown in Fig. 7 in order that its slotted end may occupy a position at a right angle to the extension $b'$ when the slide B is in its normal or upward position. This is essential in order that the requisite movement may be imparted to the lever to rotate the wheel C the desired distance. This movement is transmitted to said wheel through a spring-controlled pawl $e$, which is pivotally supported on an end of the lever and engages with a ratchet-wheel $f$, that is mounted on the arbor of the wheel C. Upon each movement of the lever to the position shown in dotted lines in Fig. 5 one movement of said wheel is effected. $e'$ is a retaining-pawl to hold said wheel in position at the end of each movement. This pawl is maintained in engagement with the ratchet-wheel by a spring $e^2$, attached thereto and to any other convenient point. $g'$ designates a bell-hammer mounted on said pawl in a position to strike a bell $g$ upon each movement of the wheel C. The bell is mounted on the arbor D′ in the rear of wheel C′.

As shown in Fig. 2, each of the wheels C and C′ has indicating-dials attached thereto. The arbor upon which the units-wheel is mounted has its front end square to receive a key by which it may be turned back to zero after a complete revolution thereof has been made.

As shown in Figs. 1 and 2, the sliding rods 9 are provided with finger-pieces and are operated by the hand. When the mechanism is used as a stationary register, which it is principally intended for, the said rods are entirely inclosed within the case, as is shown in Figs. 3 and 4, where it will be noted they pass through guide-bars $k$ $k'$ and are each provided with an enlarged portion $h$, having an oblong slot $h'$, into which projects a pin $i$ from a side of the sheave $n$. These sheaves are mounted on the rear of the case and are rotated each by an individual rope or cable $m$, that is attached thereto, passed out through the case, and secured to a convenient place on the interior of the car. When any one of said cables is pulled upon, movement is imparted to a sheave, and the pin $i$ thereon, moving in the slot $h'$, will lower a respective rod 9, which in turn will lower the slide B. When any one of the cables is released, the action of a clock-spring $n'$, mounted on the sheaves, will permit a return of rods 9 to their upper positions.

Figs. 3 and 4 are intended to illustrate separately and more clearly the indicator-wheels and adjunctive devices, which in all cases are to be used in connection with the indicator-slides and total-adding register-wheels. It will therefore be understood that when each indication is made on the wheels C C′ a tablet is also exposed, showing the character of the fare, and the total-adding register-wheels will also at the same time register the fare. The indicator-wheels C and C′ and the total-adding wheels 1 2 3, &c., should tally in their amounts.

Having fully described our invention, we claim as new and desire to secure by Letters Patent—

1. In a fare-register, the combination with trip-indicator wheels, and a slotted lever mounted adjacent to one of said wheels, of a continuous slide extending across the machine, and provided with guide extensions, to one of which the said lever is connected, a series of sliding rods, each one of which is adapted to actuate in a similar manner, the said continuous slide, and ratchet mechanism interposed between the said lever, and one of the indicator-wheels, substantially as described.

2. In a fare-register, the combination with trip-indicator wheels, of a vertically-movable slide extending across the machine, a lever having a fulcrum on the arbor of one of said indicator-wheels and actuated by the movement of said slide, ratchet mechanism actuated by said lever for advancing said indicator-wheels, a series of sliding rods having transverse slots, and each one of which is adapted to similarly actuate said vertically-movable slide, a sheave provided with a pin for each of said sliding rods, and means for rotating said sheaves, substantially as and for the purposes specified.

3. In a machine for registering and indicating fares on street-railway cars, the combination with trip-indicator wheels, of a transverse sliding bar having guide extensions, an angular lever having one end slotted and loosely connected to one of said guide extensions, and the other end fulcrumed on the arbor of one of said indicator-wheels, a pawl pivoted to said lever, a trip-indicator wheel rotated by said pawl, a series of sliding rods any one of which may actuate said transverse sliding bar, and means for actuating said sliding rods.

4. In a machine for registering and indicating fares in street-cars, the combination of a vertically-movable sliding bar lying across the machine, a series of sliding rods any one of which may actuate said sliding bar, each of said rods being provided with a transverse slot, a lever having one end provided with an oblong slot and loosely connected to an extension from said sliding bar, a pawl carried on said lever, an indicator-wheel having a ratchet-wheel with which said pawl engages, and a series of sheaves each of which is provided with a pin adapted to actuate a sliding rod, substantially as described.

5. In a fare-register, the combination with a system of total-adding register-wheels, and a system of indicator-tablets to indicate each character of fare, of a transverse sliding bar lying across the machine and having guide extensions, a lever having one end slotted and loosely connected to one of said guide extensions, trip-indicator wheels actuated by ratchet mechanism interposed between them and said lever, and a series of sliding rods, the downward movement of any one of which simultaneously actuates said total-adding register-wheels, a respective indicator-tablet, and the trip-indicator wheels.

6. In a fare and trip register, the combination with a series of total-adding register-wheels, a system of fare-indicators, and a transverse oscillating bar for controlling the positions of said fare-indicators, of a sliding bar having guide extensions, a slotted lever mounted on one of said guide extensions, a ratchet-pawl carried on said lever, a system of trip-indicator wheels actuated by said pawl, and a series of sliding rods, the downward movement of any one of which will cause a simultaneous registration of a fare; a visible indication of the character of said fare, whether a full or half fare; and a visible indication of the number of fares on each trip, substantially as shown and described.

7. In a fare-register, the combination with trip-indicator wheels, and a series of independently-sliding rods mounted below said wheels, of a vertically-movable slide extending across the machine, and provided with upwardly-projecting guide extensions, a lever having its fulcrum on the arbor of one of said indicator-wheels and a sliding connection with one of said guide extensions, ratchet mechanism actuated by said lever to advance said indicator-wheels, and means for independently actuating said sliding rods, substantially as and for the purposes specified.

8. In a fare-register, the combination with trip-indicator wheels, of a vertically-movable slide lying across the machine and provided with guide extensions, a lever having a fulcrum on the arbor of one of said trip-indicator wheels and one end slidingly connected with one of said guide extensions, ratchet mechanism actuated by said lever to rotate said indicator-wheels, a series of vertically-sliding rods each one of which is adapted to actuate said sliding bar, and each of which is provided with a transverse slot, a series of sheaves provided with pins that project into said transverse slots, and means for rotating said sheaves whereby said sliding rods are elevated, substantially as and for the purposes specified.

9. A series of independent fare-indicators, a trip-register, independent operating devices for each of such fare-indicators, and mechanism for actuating such trip-register and arranged to be engaged by each of such fare-indicator-operating devices.

10. A series of independent fare-indicators, for each fare-indicator a corresponding fare-register, an independent operating device for each fare-indicator and its corresponding register, a trip-register, and mechanism for actuating such trip-register and arranged to be engaged by each of such independent operating devices.

11. A series of independent fare-indicators visible to all the occupants of the car, a trip-register, independent operating devices for each of such independent fare-indicators, and mechanism for actuating such trip-register and arranged to be engaged by each of such fare-indicator-operating devices.

12. A series of independent fare-indicators visible to all the occupants of the car, for each fare-indicator a corresponding fare-register, an independent operating device for each fare-indicator and its corresponding register, a trip-register, and mechanism for actuating such trip-register and arranged to be engaged by each of such independent operating devices.

In testimony whereof we affix our signatures in presence of two witnesses.

JOHN F. OHMER.
HIRAM TYLER.

Witnesses:
R. C. PATTERSON,
C. D. BALDWIN.